United States Patent [19]

Ancscher

[11] Patent Number: 4,588,314
[45] Date of Patent: May 13, 1986

[54] BEARING CAGE

[76] Inventor: Joseph Anscher, 1 Bayview La., Huntington, N.Y. 11743

[21] Appl. No.: 640,860

[22] Filed: Aug. 15, 1984

[51] Int. Cl.$^4$ .................... F16C 19/20; F16C 33/00
[52] U.S. Cl. ................................. 384/614; 384/539
[58] Field of Search ............... 384/452, 513, 515, 521, 384/523, 524, 528, 609, 611, 612, 614, 617, 615, 495, 526, 539, 537, 499, 572, 510; 308/174, 221, 193

[56] References Cited

U.S. PATENT DOCUMENTS

| | | | |
|---|---|---|---|
| 1,011,028 | 12/1911 | Chambers | 384/609 |
| 1,888,634 | 11/1932 | Hughes et al. | 384/528 |
| 3,004,809 | 10/1961 | Bratt | 384/623 |
| 4,387,938 | 6/1983 | Brandenstein et al. | 384/515 X |

Primary Examiner—Stuart S. Levy
Assistant Examiner—Lynn M. Sohacki

[57] ABSTRACT

An improved bearing cage for application in angular contact thrust bearings of the type having inner and outer bearing races, ball bearings and a bearing cage. In the assembled bearing the improved bearing cage serves to maintain the ball bearings and the inner and outer bearing races in their functional positions and the complete bearing as a unitized assembly prior to its incorporation into some other assembly. The improved bearing cage can be fabricated through injection molding techniques in a straight in-and-out core pin type mold.

26 Claims, 14 Drawing Figures

BEARING CAGE

BACKGROUND OF THE INVENTION

This invention relates to ball bearing cages and particularly to an improved molded bearing cage for application in unitized angular contact thrust bearings.

Angular contact thrust bearings are designed to carry high, axially directed thrust loads. In some applications of such bearings it is desirable to utilize a bearing cage to retain the alignment of ball bearings between the curvilinear raceways of the bearing. Moreover, it is useful to create a unitized bearing assembly in which the races, ball bearings and bearing cage once assembled are held together as a unit prior to incorporation of the complete bearing into some other assembly.

One design of such a unitized angular contact thrust bearing heretofore proposed utilizes a bearing cage which also functions to hold the complete bearing together as a unitized assembly. The bearing employs inner and outer bearing races designed to provide confronting curvilinear raceways, ball bearings and a bearing cage made of a resilient injection molded material. The bearing cage in this bearing extends through the raceway region, has ball bearing cavities functionally designed to retain the balls in their proper alignment and has retaining lips to engage respectively the upper and lower surfaces of the inner and outer races and which retain the races together as a unitized assembly. However, the bearing cage design heretofore proposed is unsuitable for efficient injection molding production. The retaining lip of the previously proposed bearing cage design employs certain undercuts which make the bearing cage practically impossible to manufacture by injection molding processes alone without some amount of machining to produce the undercuts. Inasmuch as there is a significant economic advantage to manufacturing the completed cage by injection molding processes alone as compared to molding and then machining, it has been highly desirable to devise a cage design which can be produced in completed form by modern injection molding processes.

SUMMARY OF THE INVENTION

It would be of significant cost advantage if a bearing cage for use in the proposed angular contact thrust bearing could be invented which can be manufactured completely by injection molding processes alone without adversely affecting the multiple function capacity of the part. An improved bearing cage has been invented by the applicant which, it has been discovered, can be manufactured entirely through modern injection molding techniques. Further, it has been discovered that the improved bearing cage performs well not only its function of retaining the ball bearings in their proper alignment but also its function of retaining both inner and outer races as a unitized assembly. Moreover, the improved bearing cage has the added advantage over the bearing cage which has been heretofore proposed of enabling easier assembly and greatly facilitated disassembly of the bearing unit. Further, by removing the undercut region from the bearing cage, the present invention enables the part to be manufactured in a straight in-and-out core pin type mold, thus substantially reducing its cost of manufacture and improving its reliability of manufacture.

The bearing cage which has been heretofore proposed comprises an upper and lower cylindrical shoulder, a connecting shoulder having circumferentially disposed therein and extending into the upper and lower cylindrical shoulders ball bearing cavities and having an upper retaining lip integral with the axially uppermost edge of the upper shoulder, radialy inwardly directed and extending circumferentially around the full plane of the upper cylindrical shoulder, and a lower retaining lip integral with the axially lowermost edge of the lower shoulder, radially outwardly directed and extending circumferentially around the full plane of the lower cylindrical shoulder. However, the retaining lip design of the bearing cage heretofore proposed employs certain undercuts, particularly on the axially lowermost surface of the upper retaining lip, which make this bearing cage virtually impossible to manufacture by injection molding processes alone, due to the radially inward extension of the retaining lip without some amount of machining to produce the undercuts. This added step to the previously proposed bearing cage's manufacture—of machining the undercuts—makes the cage prohibitively expensive for use in the proposed bearing.

The improved bearing cage embodies a design which can be manufactured by the relatively inexpensive yet reliable process of a one step injection molding operation. The improved bearing cage comprises an upper and lower cylindrical shoulder, a connecting shoulder having circumferentially disposed therein and extending into the upper and lower cylindrical shoulders ball bearing retaining cavities, at least two upper restraining tabs integral with the axially uppermost edge of the upper shoulder and projecting radially inwardly, and at least two lower restraining tabs integral with the axially lowermost edge of the lower shoulder and projecting radially outwardly, both upper and lower sets of restraining tabs respectively positioned axially directly over and under nonidentical bearing restraining cavities of the connecting shoulder and having a circumferential dimension less than the circumferential dimension of the bearing retaining cavity opening above or below which it is positioned. The upper restraining tabs extend for a sufficient radial dimension to engage the axially uppermost edge of the inner race and to restrain the axial displacement of that race so as to keep it in its functional alignment confronting the curvilinear raceway of the outer race. Similarly, the lower restraining tabs extend out in a radial direction for a distance sufficient to engage the axially lowermost edge of the outside race and to restrain the axial displacement of that race so as to keep it in its functional alignment confronting the curvilinear raceway of the inner race. Once the bearing unit has been assembled the restraining tabs maintain the bearing as a unitized assembly.

Positioning the restraining tabs either directly over or directly under the ball bearing retaining cavities and limiting the circumferential length of the restraining tabs to no longer than the circumferential dimension of the ball bearing cavities, makes possible the manufacture of the bearing cage through a one step injection molding process. Each of the restraining tabs, even though it does involve an undercut, can be molded using an under and over approach where the portion of the mold which forms the restraining undercut portion of the tab is passed through the opening of one of the ball bearing cavities prior to injection of the bearing cage material and withdrawn from the mold assembly prior to removal of the molded part after injection of the cage molding material into the mold. Thus, the improved bearing cage can be manufactured using only injection molding techniques, which one step manufacturing would not have been possible with the bearing cage heretofore proposed.

The use of restraining tabs as opposed to restraining lips not only facilitates production of the cage through a one step injection molding process but also greatly facilitates assembly and disassembly of the bearing units. The previously proposed retaining lips which would have extended circumferentially around the full plane of the upper and lower shoulders would have required significantly more effort to deform sufficiently to pass therethrough respectively the inner and outer races. On the other hand the tabs of the improved bearing cage by presenting a lesser bulk of cage material to be deformed and by not extending completely around the circumferential edges of the shoulders are much more easiy deformed by the insertion and removal of the bearing races into and from their respective assembled positions relative to the bearing cage.

It is therefore, one object of the present invention to provide for a rotary contact thrust bearing a bearing cage which not only restrains the ball bearings in their proper alignment and restrains the axial movement of the inner and outer bearing races so as to maintain the functional confronting alignment of the inner and outer raceways, but also comprises a cage design which can be reliably manufactured by modern injection molding techniques without a second manufacturing step of machining the molded bearing cage.

It is another object of this invention to provide such a bearing cage which allows for facilitated assembly and disassembly of the complete rotary contact thrust bearing units.

BRIEF DESCRIPTION OF THE DRAWINGS

These and other objects of the invention will become apparent from the following written description and drawings in which.

DESCRIPTION OF THE PREFERRED EMBODIMENT

Figure 1:
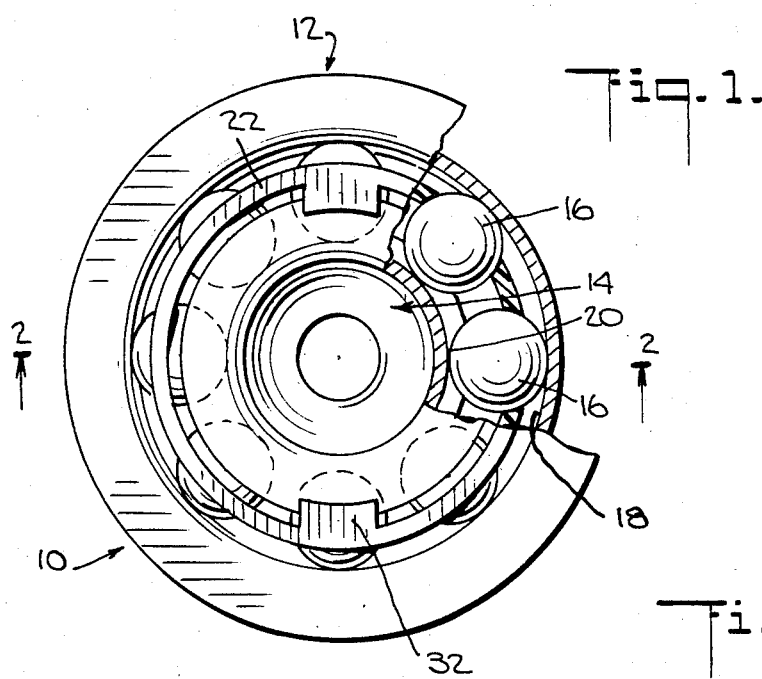
FIG. 1 is a front view partially broken away of a unitized rotary thrust bearing including the improved bearing cage of the present invention.
Figure 2:
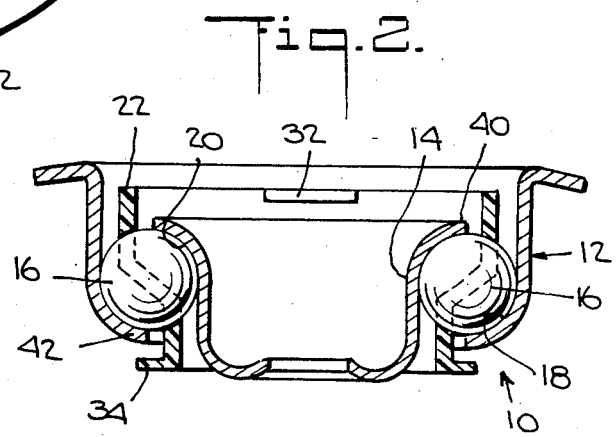
FIG. 2 is a sectional view taken along the line 2—2 of FIG. 1.

Referring to FIGS. 1 and 2, which illustrate one embodiment of the bearing assembly with the improved bearing cage, the bearing assembly designated generally at 10 includes an outer annular race 12 and an inner annular race 14 with a full complement of bearing balls 16 therebetween and a bearing cage 22. Races 12 and 14 each have curvilinear raceways therein designated respectively 18 and 20 which engage the bearing balls 16. Furthermore, outer race 12 includes a lower flange 42 and inner race 14 includes an upper flange 40.

Figure 3:
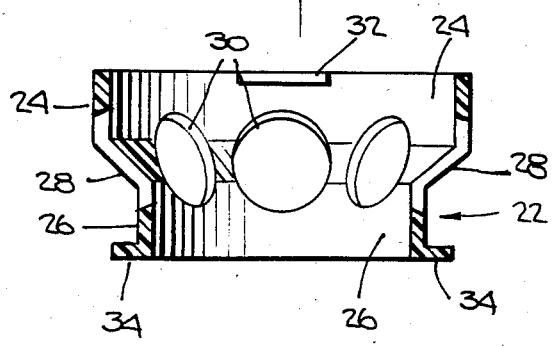
FIG. 3 is a sectional view of the improved bearing cage taken along the line 2—2 of FIG. 1.
Figure 4:
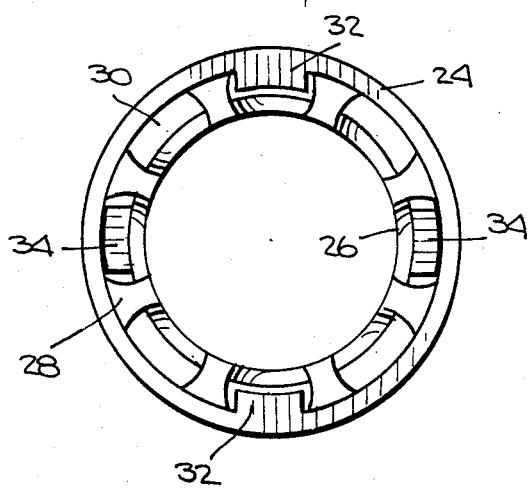
FIG. 4 is a front view of the improved bearing cage.

Referring now to FIGS. 3 and 4, which illustrate one embodiment of the improved bearing cage, the improved bearing cage 22 includes an upper cylindrical shoulder 24, a lower cylindrical shoulder 26 having an outer diameter smaller than the inner diameter of the upper cylindrical shoulder 24, a connecting shoulder 28 having circumferentially disposed therein and extending into the upper and lower cylindrical shoulders 24 and 26 respectively functionally designed ball bearing retaining cavities 30, upper restraining tabs 32 and lower restraining tabs 34 integral with upper and lower cylindrical shoulders 24 and 26 respectively. Connecting shoulder 28 is conically integral with upper cylindrical shoulder 24 and lower cylindrical shoulder 26. As is evident in FIG. 2, the conical shape of the connecting shoulder 28 allows for the bearing cage to fit between inner race 14 and outer race 12 when the complete bearing 10 is in its assembled state. Upper restraining tabs 32 and lower restraining tabs 34 are respectively positioned axially directly over and under nonidentical (i.e., not the same) bearing retaining cavities 30.

Upper restraining tabs 32 extend in a radially inward direction from upper cylindrical shoulder 24 and are of circumferential dimension not greater than the circumferential dimension of the ball bearing retaining cavities 30. Furthermore, the upper restraining tabs 32 extend radially inwardly from the upper cylindrical shoulder 24 to a radial distance from the axis of the upper and lower cylindrical shoulders 24 and 26 respectively not less than the radius of the outside surface of the lower cylindrical shoulder 26. The upper restraining tabs, however, are of sufficient radial length to extend over upper flange 40 of inner race 14. In the assembled state of bearing unit 10 upper tabs 32 restrain axial displacement of inner race 14 so as to keep inner race 14 in its functional alignment confronting the curvilinear raceway 18 of outer race 12.

Lower restraining tabs 34 extend radially outwardly from lower cylindrical shoulder 26 to a radial distance from the axis of upper and lower cylindrical shoulders 24 and 26 respectivley less than the radius of the inner surface of the upper cylindrical shoulder 24. The lower restraining tabs 34, however, are of sufficient radial length to extend over lower flange 42 of outer race 12. In the assembled state of bearing unit 10, lower tabs 34 restrain axial displacement of outer race 12 so as to keep it it its functional alignment confronting the curvilinear raceway 20 of inner race 14.

Figure 5:
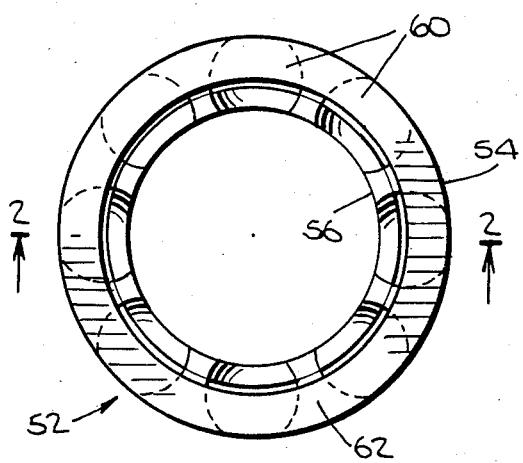
FIG. 5 is a top view of the previously proposed bearing cage.
Figure 6:
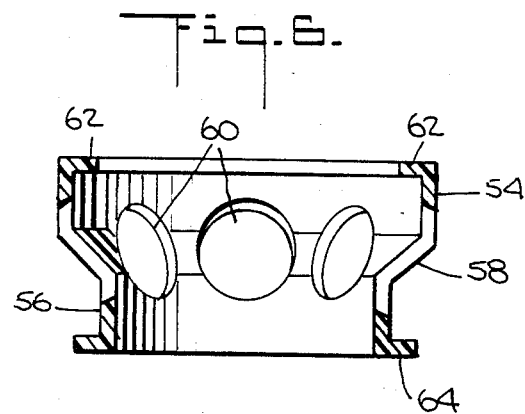
FIG. 6 is a sectional view of the previously proposed bearing cage taken along the line 2—2 of FIG. 5.

Referring now to FIGS. 5 and 6, the bearing cage 52 heretofore proposed, which as with the improved bearing cage 22 would function in conjunction with outer race 12, inner race 14 and ball bearings 16 of FIGS. 1 and 2, includes an upper cylindrical shoulder 54, a lower cylindrical shoulder 56 having a smaller diameter than the diameter of upper cylindrical shoulder 54, a connecting shoulder 58 having circumferentially disposed therein and extending into the upper and lower cylindrical shoulders 54 and 56 respectively ball bearing retaining cavities 60, upper restraining lip 62 and lower restraining lip 64 integral with upper and lower cylindrical shoulders 54 and 46 respectivley. Connecting shoulder 58 is conically integral with upper cylindrical shoulder 54 and lower cylindrical shoulder 56.

Upper restraining lip 62 extends in a radially inward direction from upper cylindrical shoulder 54 and extends circumferentially around the full plane of upper cylindrical shoulder 54. Upper restraining lip 62 extends radially inward sufficient distance to extend over the upper flange 40 of inner race 14. In the assembled state of the bearing unit, upper lip 62 restrains the axial displacement of inner race 14 so as to keep it in its functional alignment confronting the curvilinear raceway 18 of outer race 12.

Lower restraining lip 64 extends radially outward from lower cylindrical shoulder 56 and extends circumferentially around the full plane of lower cylindrical shoulder 56. Lower restraining lip 64 extends radially outward sufficient distance to extend over the lower flange 42 of outer race 12. In the assembled state of the bearing unit, lower lip 64 restrains axial displacement of outer ring 12 so as to keep it in its functional alignment confronting the curvilinear raceway 20 of inner race 14.

As is evident, the axially lowermost surface of upper lip 62 and the axially uppermost surface of lower lip 64 employ undercuts in the cage unit. For example, to mold upper lip 62 a solid surface of a mold body would have to be positioned to describe the entire radially inner surface of upper cylindrical shoulder 54 and the axially lowermost surface of upper lip 62 during injection of the molding material into the bearing cage mold. Inasmuch as the diameter of the axial upper opening and lower opening of the bearing cage 52 are each smaller than the diameter of the mold body which would describe the inner surface of upper cylindrical shoulder 54 it would be impossible to withdraw the mold body if it were a solid unit from within the formed bearing cage. Moreover, the dimensions of the bearing cage are too small to allow for use of a collapsible mold unit within the upper cylindrical shoulder. Thus, the undercut of upper lip 62 can not be made by injection molding techniques. Production of bearing cage 52 would require the second step after molding an unfinished bearing cage of machining away molded material from the radially interior surface of upper cylindrical shoulder 54 to form the undercut of the axially lowermost surface of upper lip 62 of the bearing cage. This second step, of maching the undercuts into the bearing cage, not only adds significantly to the cost of production of the part but also decreases the reliability of quality production of the part.

In juxtaposition to the situation of the bearing cage heretofore proposed, the improved bearing cage is readily manufacturable via modern injection molding techniques. The positioning of the tabs either over or under, in an axial sense, non-identical (i.e., not the same) ball bearing retaining cavities 30, the sizing of the tabs to a circumferential dimension not larger than the circumferential dimension of the ball bearing retaining cavities 30, and the sizing of the tabs to a radial dimension as described in the preceding paragraphs makes possible the manufacture of the bearing cage by an injection molding procedure alone, thereby greatly reducing its production cost as well as increasing the reliability of quality production of the part from that of the bearing cage heretofore proposed which required a first step of injection molding followed by machining of the bearing cage.

Figure 7:
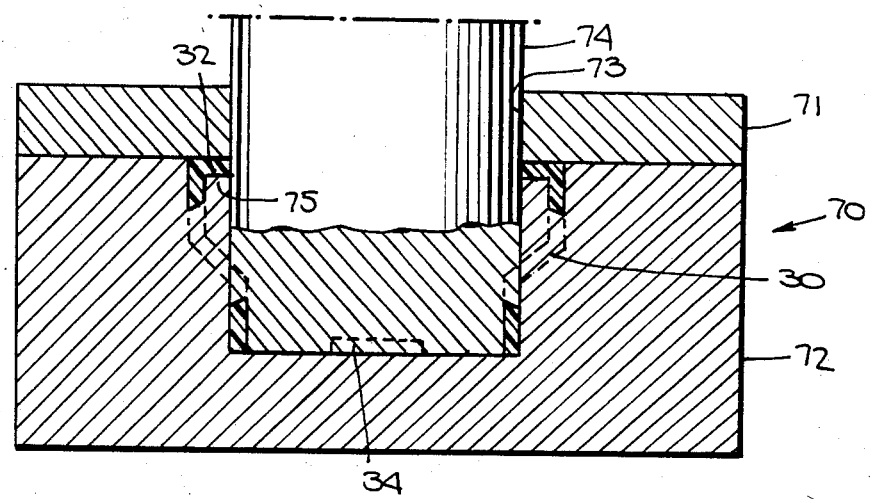
FIG. 7 is a cross-section view showing the basic construction of the mold for making the bearing cage of the present invention.

FIG. 7 illustrates the basic elements of the mold used in molding the improved bearing cage of the present invention. Not all of the mold details are shown since, in general, the construction of molds of this general type are well known to those skilled in the art. Basically, the mold 70 includes an upper die block 71, a lower die block 72 and core pin 74. Lower die block 72 has a recess in the shape of the external surface of the bearing cage shown in FIGS. 3, 4 and 5. The upper die block 71 seals off the recess of the lower die block 72 and contains a bore 73 for the insertion of core pin 74 into the recess of the lower die block 72.

In accordance with the present invention the external surface of core pin 74 describes the inner surface of the bearing cage 22. The axially lowermost surface of upper restraining tabs 32 however, is described by the axially topmost surface of a columnar portion 75 of lower die block 72 which extends axially up through the space corresponding to the bearing retaining cavity 30 over which tab 32 is axially positioned. In like manner the axially uppermost surface of lower tab 34 is described by the axially lowermost surface of a columnar portion of core pin 74 which extends axially downward through the space corresponding to the bearing retaining cavity 30 under which tab 34 is axially positioned.

In the operation of mold 70, upper and lower die blocks 71 and 72 are brought together and core pin 74 is inserted, through upper die block 71, to a position where its flat axially lowermost end abuts the flat bottom of the recess in lower die block 72. The space between the mold parts is then filled with the material to be molded in conventional fashion. When the material has solidified, the die blocks 71 and 72 are separated and the core pin 74 is withdrawn ejecting the bearing cage 22. Inasmuch as no undercuts are employed in the improved bearing cage design, the formed bearing cage slides without impediment from the mold pieces 71, 72 and 74.

Moreover it has been found that the improved design of bearing cage provides for easier assembly of the bearing unit than would be expected with the previous concept of bearing cage. During assembly operations, inner race 14 is moved coaxially toward bearing cage 22. As upper flange 40 comes into contact with upper tabs 32, upper tabs 32 are flexed axially in the direction of relative movement of inner race 14 and radially outwardly until sufficiently deformed for inner race 14 to pass past upper tabs 32 after which upper tabs 32, being formed of a resilient material, reassume their former shape. Thereafter, or if preferred, before inner race 14 is inserted into bearing cage 22, ball bearings 16 are positioned in ball bearing cavities 30. If desired, ball bearing cavities 30 can be appropriately dimensioned to retain ball bearings 16 without contact of either inner race 14 or outer race 12 yet still allow the desired free rotation of ball bearings 16 during use of the assembled bearing 10. To complete assembly, outer race 12 is moved coaxially toward bearing cage 22. As lower flange 42 comes into contact with lower tabs 34, lower tabs 34 are flexed axially in the direction of relative movement of outer race 12 and radially inwardly until sufficiently deformed for outer race 12 to pass past lower tabs 34, thereafter lower tabs 34, being formed of a resilient material, reassume their former shape. Thereafter lower tabs 34, by bearing against the surface of lower flange 42, serve to restrain the axial movement of outer race 12 so that it is not displaced away from its functional position confronting inner race 14. Similarly upper tabs 32, by bearing against the surface of upper flange 40, serve to restrain the axial movement of inner race 14 so that it is not displaced away from its functional position confronting outer race 12. During assembly upper and lower tabs 32 and 34 respectivley can be flexed either by pressure directly from upper and lower flanges 40 and 42 respectively as inner race 14 and outer race 12 are moved in a coaxial direction to their respective functional positions in the assembled bearing 10, or the tabs can be flexed by pressure from some other source. Of course, outer race 12 can also be assembled to bearing cage 22 before inner race 14 is assembled to bearing cage 22.

Disassembly of the assembled bearing 10 occurs in a reverse procedure to the assembly procedure described above except that upper tabs 32 are flexed radially outwardly and axially in the direction of disassembly of inner ring 14 and lower tabs 34 are flexed radially inwardly and axially in the direction of disassembly of outer race 12.

The previous concept for a bearing cage did not utilize upper and lower tabs as in the instant invention, but rather, employed upper and lower lips integral with the upper and lower shoulders respectively and extending in the same radial direction as the upper and lower tabs 32 and 34 of the improved cage 22 along the entire circumference of the upper and lower shoulders. As noted above, this proposed cage could not have been readily manufactured by injection molding techniques without machining of the cages after molding. Additionally, assembly and disassembly of the complete bearing units 10 would have been significantly more difficult than it is with the improved bearing cage 22. Due to the increased bulk of material to be deformed and the increased structural strength of lips extending circumferentially around the entire surface of the upper and lower shoulders the retaining lips of the previous concept bearing cage would have required far greater manipulation and pressure to insert the flanges of the inner and outer races past the retaining lips during assembly. Moreover, disassembly would have been more difficult for the same reasons and also for the reason that the retaining lips would have completely covered and obscured the flanges 40 and 42 of the inner and outer races, virtually eliminating the possiblity of inserting a mechanical means between the retaining lip and the flange to pry the one past the other during disassembly. However, this procedure for disassembly is readily available with the restraining tabs 32 and 34 of the improved bearing cage 22. In addition, during disassembly of a bearing utilizing the improved bearing cage 22 it is only necessary to pry the flanges 40 and 42 of the inner and outer races past a finite number of tabs and therefore a relatively finite number of points of restraint as compared to the situation with the previous concept bearing cage where the restraining lips have points of contact along the entire circumference of the flanges 40 and 42 and for disassembly the races 12 and 14 must be manipulated past this completely enclosing restraining structure.

It has been shown that the tabs 32 and 34 of the improved bearing cage 22 function very well in retaining the inner and outer races 14 and 12 in their functional confronting positions as well as facilitating the ease of assembly and disassembly operations of the complete bearing unit 10.

The improved bearing cage can be fabricated of any moldable material such as, for example, nylon, acetal, polyester, polycarbonate, polyethylene, polypropylene or ABS.

Other embodiments of the present invention include using more than two tabs either or both upper restraining tabs or lower restraining tabs. For example, either three or four tabs could be used as upper restraining tabs while using only two tabs as lower restraining tabs if such a use was desirable for the intended application of the bearing unit. Moreover, the tabs can be positioned axially either over or under any combination of the bearing cavities 30 as is desired, so long as an upper and lower restraining tab is not positioned axially over and under the same bearing cavity. Additionally, the circumferential dimension of each of the tabs can be adjusted to accommodate production of the part or assembly, use or disassembly of the bearing unit to any length less than the circumferential dimension of the bearing cavities.

Figure 8:
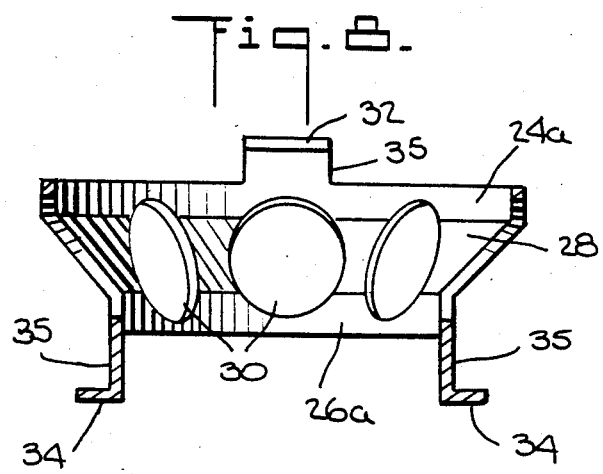
FIG. 8 is a sectional view of an embodiment of the improved bearing cage wherein the axial dimension of the upper and lower cylindrical shoulders has been reduced and wherein connecting means integral with the restraining tabs and the cylindrical shoulders maintain the restraining tabs in their functional axial location.

In another embodiment of the current invention, an example of which is shown in FIG. 8, the axial dimension of either or both of the upper and lower cylindrical shoulders 24 and 26 can be reduced and the restraining tabs maintained in their functional axial location by extending axially from the axially shortened cylindrical shoulder a connecting means 35 integral with the restraining tab and the cylindrical shoulder.

Figure 9:
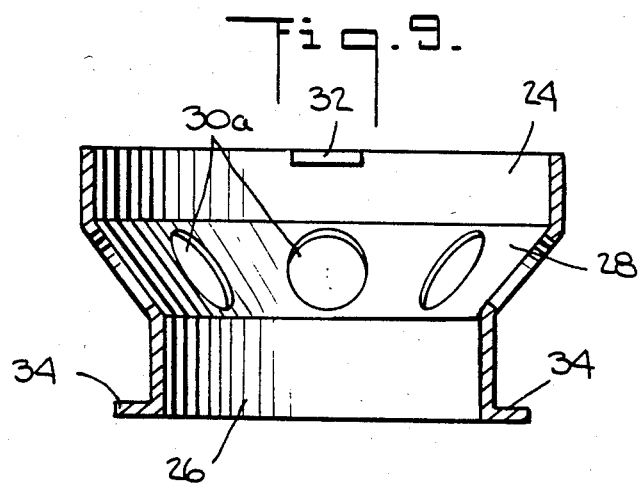
FIG. 9 is a sectional view of an embodiment of the improved bearing cage wherein the ball bearing retaining cavities do not extend axialy into either the upper or lower cylindrical shoulders.
Figure 10:
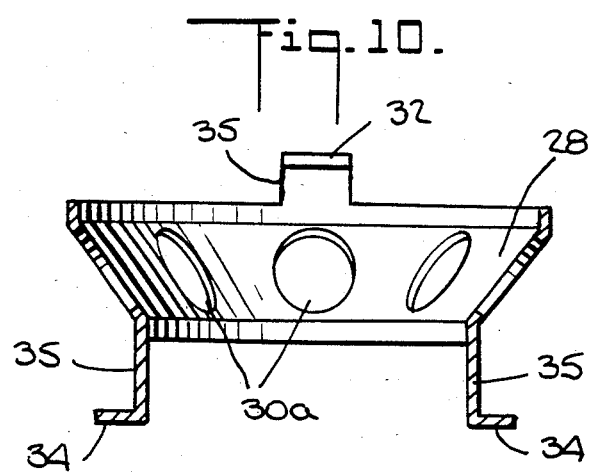
FIG. 10 is a sectional view of an embodiment of the improved bearing cage wherein the axial dimension of the upper and lower cylindrical shoulders has been shortened, connecting means extend from the cylindrical shoulders to the restraining tabs, and the ball bearing retaining cavities do not extend axially into either the upper or lower cylindrical shoulders.
Figure 11:
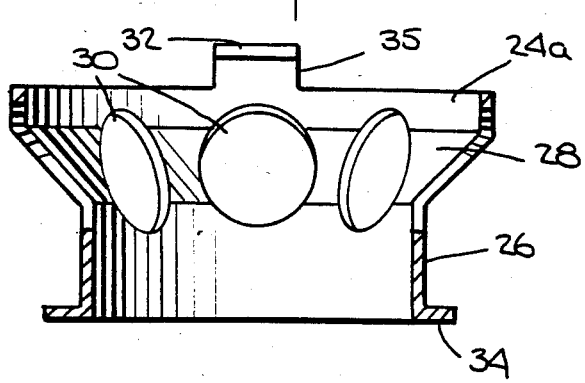
FIG. 11 is a sectional view of an embodiment of the improved bearing cage wherein the axial dimension of the upper cylindrical shoulder has been reduced and connecting means integral with the upper restraining tabs and the upper cylindrical shoulder maintain the upper restraining tabs in their functional axial location and wherein the lower restraining tabs are disposed on the lower cylindrical shoulder.
Figure 12:
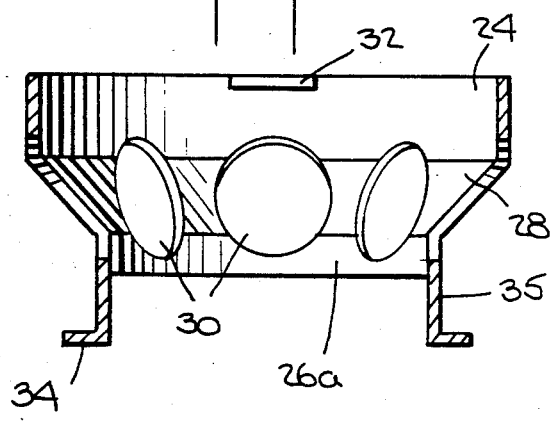
FIG. 12 is a sectional view of an embodiment of the improved bearing cage wherein the upper restraining tabs are disposed on the upper cylindrical shoulder and wherein the axial dimension of the lower cylindrical shoulder has been reduced and connecting means integral with the lower restraining tabs and lower cylindrical shoulder maintain the lower restraining tabs in their functional axial location.
Figure 13:
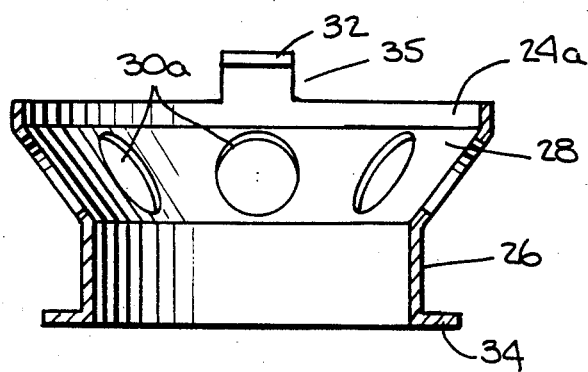
FIG. 13 is a sectional view of an embodiment of the improved bearing cage wherein the axial dimension of the upper cylindrical shoulder has been reduced and connecting means integral with the upper restraining tabs and the upper cylindrical shoulder maintain the upper restraining tabs in their functional axial location and wherein the lower restraining tabs are disposed on the lower cylindrical shoulder and also wherein the ball bearing restraining cavities do not extend axially into either the upper or lower cylindrical shoulders.
Figure 14:
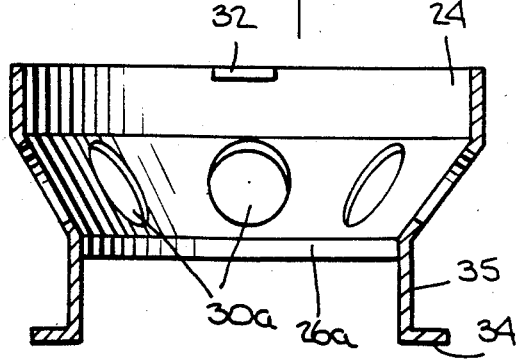
FIG. 14 is a sectional view of an embodiment of the improved bearing cage wherein the upper retaining tabs are disposed on the upper cylindrical shoulder and wherein the axial dimension of the lower cylindrical shoulder has been reduced and connecting means integral with the lower restraining tabs and lower cylindrical shoulder maintain the lower restraining tabs in their functional axial location and also wherein the ball bearing cavities do not extend axially into either the upper or lower cylindrical shoulders.

In yet another embodiment of the current invention, an example of which is shown in FIG. 9, the bearing unit 10 can be so designed that the ball bearing retaining cavities 30a which are positioned circumferentially around connecting shoulder 28 are located entirely in connecting shoulder 28 and do not extend axially into either upper cylindrical shoulder 24 or lower cylindrical shoulder 26. Moreover, the conical shape of connecting shoulder 28 is not essential. Connecting shoulder 28 may be of any shape so long as it connects upper and lower cylindrical shoulder 24 and 26, provides ball bearing cavities 30, and fits between inner and outer bearing races 14 and 12 in the assembled bearing.

While the present invention has been particularly described in terms of specific embodiments thereof, it will be understood that numerous variations are now enabled to those skilled in the art, which variations yet reside within the scope of the invention. Accordingly, the invention is to be broadly construed, and limited only by the scope and spirit of the claims appended hereto.

What is claimed is:

1. An improved bearing cage for use in a unitized contact thrust bearing assembly of the type having
   an outer bearing race having on its radially inward surface a curvilinear raceway,
   an inner race coaxial with the first race having on its radially outward surface a curvilinear raceway in confronting relation to the curvilinear raceway of the outer race,
   a complement of bearing balls between the inner and outer curvilinear raceways, and
   a bearing cage, having upper and lower coaxial cylindrical shoulders, the diameter of the radially inner surface of the upper cylindrical shoulder being greater than the diameter of the radially outer surface of the lower cylindrical shoulder, said bearing cage having a connecting shoulder integral with the upper and lower cylindrical shoulders and having circumferentially disposed in said connecting shoulder and extending axially into said upper and lower cylindrical shoulders a plurality of ball bearing retaining cavities, wherein the improvement comprises:
   a bearing cage having at least two upper restraining tabs disposed on the upper cylindrical shoulder each upper restraining tab being radially inwardly directed and positioned axially directly above one of the bearing retaining cavities and each upper restraining tab having a circumferential dimension less than or equal to the circumferential dimension of the bearing retaining cavity above which it is positioned,
   said bearing cage having at least two lower restraining tabs disposed on the lower cylindrical shoulder, each lower restraining tab being radially outwardly directed and positioned axially directly below one of the bearing retaining cavities not having an upper restraining tab positioned axially thereover, and each lower restraining tab having a circumferential dimension less than or equal to the circumferential dimension of the bearing retaining cavity below which it is positioned,
   the upper restraining tabs serving to restrain in the assembed bearing the inner race from an axial displacement away from its functional position confronting the outer race,
   the lower restraining tabs serving to restrain in the assembled bearing the outer race from an axial displacement away from its functional position confronting the inner race,
   said upper restraining tabs being sufficiently resilient to allow insertion of the inner race past said tabs to its functional assembled position,
   said lower restraining tabs being sufficiently resilient to allow movement of the outer race past said tabs to its functional assembled position,
   said upper restraining tabs extending radially inwardly from the upper cylindrical shoulder to a radial distance from the axis of the upper and lower cylindrical shoulders not less than the radius of the outside surface of the lower cylindrical shoulder, and
   said lower restraining tabs extending radially outwardly from the lower cylindrical shoulder to a radial distance from the axis of the upper and lower cylindrical shoulders less than the radius of the inner surface of the upper cylindrical shoulder.

2. The improved bearing retaining cage according to claim 1, wherein said upper tabs comprises two tabs positioned circumferentially substantially 180° opposite each other.

3. The improved bearing retaining cage according to claim 1, wherein, said lower tabs comprises two tabs positioned circumferentially substantially 180° opposite each other.

4. The improved bearing retaining cage according to claim 1, wherein said upper tabs are positioned on the substantially axially uppermost portion of the upper cylindrical shoulder and where said lower restraining tabs are positioned on the substantially lowermost portion of the lower cylindrical shoulder.

5. An improved bearing cage for use in a unitized contact thrust bearing assembly of the type having
   an outer bearing race having on its radially inward surface a curvilinear raceway,
   an inner race coaxial with the first race having on its radially outward surface a curvilinear raceway in confronting relation to the curvilinear raceway of the outer race,
   a complement of bearing balls between the inner and outer curvilinear raceways, and
   a bearing cage, having upper and lower coaxial cylindrical shoulders, the diameter of the radially inner surface of the upper cylindrical shoulder being greater than the diameter of the radially outer surface of the lower cylindrical shoulder, said bearing cage having a connecting shoulder integral with the upper and lower cylindrical shoulders and having circumferentially disposed in said connecting shoulder and extending axially into said upper and lower cylindrical shoulders a plurality of ball bearing retaining cavities, wherein the improvement comprises:
   a bearing cage having at least two upper restraining tabs, each disposed on a separate connecting means which extends axially upwards from the upper cylindrical shoulder and is integral with the upper cylindrical shoulder, each upper restraining tab being radially inwardly directed and positioned axially directly above one of the bearing retaining cavities and each upper restraining tab having a circumferential dimension less than or equal to the circumferential dimension of the bearing retaining cavity above which it is positioned, said bearing cage having at least two lower restraining tabs, each disposed on a separate connecting means which extends axially downward from the lower cylindrical shoulder and is integral with the lower cylindrical shoulder and the lower restraining tab, each lower restraining tab being radially outwardly directed and positioned axially directly below one of the bearing retaining cavities not having an upper restraining tab positioned axially thereover, and each lower restraining tab having a circumferential dimension less than or equal to the circumferential dimension of the bearing retaining cavity below which it is positioned, the upper restraining tabs serving to restrain in the assembled bearing the inner race from an axial displacement away from its functional position confronting the outer race, the lower restraining tabs serving to restrain in the assembled bearing the outer race from an axial displacement away from its functional position confronting the inner race, said upper restraining tabs being sufficiently resilient to allow insertion of the inner race past said tabs to its functional assembled position, said upper restraining tabs extending radially inwardly from the upper cylindrical shoulder to a radial distance from the axis of the upper and lower cylindrical shoulders not less than the radius of the outside surface of the lower cylindrical shoulder, and said lower restraining tabs extending radially outwardly from the lower cylindrical shoulder to a radial distance from the axis of the upper and lower cylindrical shoulders less than the radius of the inner surface of the upper cylindrical shoulder.

6. The improved bearing retaining cage according to claim 5, wherein said upper tabs comprises two tabs positioned circumferentially substantially 180° opposite each other.

7. The improved bearing retaining cage according to claim 5, wherein, said lower tabs comprises two tabs positioned circumferentially substantially 180° opposite each other.

8. An improved bearing cage for use in a unitized contact thrust bearing assembly of the type having
an outer bearing race having on its radially inward surface a curvilinear raceway,
an inner race coaxial with the first race having on its radially outward surface a curvilinear raceway in confronting relation to the curvilinear raceway of the outer race,
a complement of bearing balls between the inner and outer curvilinear raceways, and
a bearing cage, having upper and lower coaxial cylindrical shoulders, the diameter of the radially inner surface of the upper cylindrical shoulder being greater than the diameter of the radially outer surface of the lower cylindrical shoulder, said bearing cage having a connecting shoulder integral with the upper and lower cylindrical shoulders and having circumferentially disposed in said connecting shoulder a plurality of ball bearing retaining cavities, wherein the improvement comprises:
a bearing cage having at least two upper restraining tabs disposed on the upper cylindrical shoulder each upper restraining tab being radially inwardly directed and positioned axially directly above one of the bearing retaining cavities and each upper restraining tab having a circumferential dimension less than or equal to the circumferential dimension of the bearing retaining cavity above which it is positioned,
said bearing cage having at least two lower restraining tabs disposed on the lower cylindrical shoulder, each lower restraining tab being radially outwardly directed and positioned axially directly below one of the bearing retaining cavities not having an upper restraining tab positioned axially thereover, and each lower restraining tab having a circumferential dimension less than or equal to the circumferential dimension of the bearing retaining cavity below which it is positioned,
the upper restraining tabs serving to restrain in the assembled bearing the inner race from an axial displacement away from its functional position confronting the outer race,
the lower restraining tabs serving to restrain in the assembled bearing the outer race from an axial displacement away from its functional position confronting the inner race,
said upper restraining tabs being sufficiently resilient to allow insertion of the inner race past said tabs to its functional assembled position,
said lower restraining tabs being sufficiently resilient to allow movement of the outer race past said tabs to its functional assembled position,
said upper restraining tabs extending radially inwardly from the upper cylindrical shoulder to a radial distance from the axis of the upper and lower cylindrical shoulders not less than the radius of the outside surface of the lower cylindrical shoulder,
said lower restraining tabs extending radially outwardly from the lower cylindrical shoulder to a radial distance from the axis of the upper and lower cylindrical shoulders less than the radius of the inner surface of the upper cylindrical shoulder; and
said ball bearing retaining cavities not extending axially into said upper and lower cylindrical shoulders.

9. The improved bearing retaining cage according to claim 8, wherein said upper tabs comprises two tabs positioned circumferentially substantially 180° opposite each other.

10. The improved bearing retaining cage according to claim 8, wherein, said lower tabs comprises two tabs positioned circumferentially substantially 180° opposite each other.

11. The improved bearing retaining cage according to claim 8, wherein said upper tabs are positioned on the substantially axially uppermost portion of the upper cylindrical shoulder and where said lower restraining tabs are positioned on the substantially lowermost portion of the lower cylindrical shoulder.

12. An improved bearing cage for use in a unitized contact thrust bearing assembly of the type having an outer bearing race having on its radially inward surface a curvilinear raceway, an inner race coaxial with the first race having on its radially outward surface a curvilinear raceway in confronting relation to the curvilinear raceway of the outer race, a complement of bering balls between the inner and outer curvilinear raceways, and a bearing cage, having upper and lower coaxial cylindrical shoulders, the diameter of the radially inner surface of the upper cylindrical shoulder being greatr than the diameter of the radially outer surface of the lower cylindrical shoulder, said bearing cage having a connecting shoulder integral with the upper and lower cylindrical shoulders and having circumferentially disposed in said connecting shoulder a plurality of ball bearing retaining cavities, wherein the improvement comprises:

a bearing cage having at least two upper restraining tabs, each disposed on a separate connecting means which extends axially upwards from the upper cylindrical shoulder and is integral with the upper cylindrical shoulder, each upper restraining tab being radially inwardly directed and positioned axially directly above one of the bearing retaining cavities and each upper restraining tab having a circumferential dimension less than or equal to the cicumferential dimension of the bearing retaining cavity above which it is positioned, said bearing cage having at least two lower restraining tabs, each disposed on a separate connecting means which extends axially downward from the lower cylindrical shoulder and is integral with the lower cylindrical shoulder and the lower restraining tab, each lower restraining tab being radially outwardly directed and positioned axially directly below one of the bearing retaining cavities not having an upper restraining tab positioned axially thereover, and each lower restraining tab having a circumferential dimension less than or equal to the circumferential dimension of the bearing retaining cavity below which it is positioned, the upper restraining tabs serving to restrain in the assembled bearing the inner race from an axial displacement away from its functional position confronting the outer race, the lower restraining tabs serving to restrain in the assembled bearing the outer race from an axial displacement away from its functional position confronting the inner race, said upper restraining tabs being sufficiently resilient to allow insertion of the inner race past said tabs to its functional assembled position, said upper restraining tabs extending radially inwardly from the upper cylindrical shoulder to a radial distance from the axis of the upper and lower cylindrical shoulders not less than the radius of the outside surface of the lower cylindrical shoulder, said lower restraining tabs extending radially outwardly from the lower cylindrical shoulder to a radial distance from the axis of the upper and lower cylindrical shoulders less than the radius on the inner surface of the upper cylindrical shoulder, and said ball bearing retaining cavities not extending axially into said upper and lower cylindrical shoulders.

13. The improved bearing retaining cage according to claim 12, wherein said upper tabs comprises two tabs positioned circumferentially substantially 180° opposite each other.

14. The improved bearing retaining cage according to claim 12, wherein, said lower tabs comprises two tabs positioned circumferentially substantially 180° opposite each other.

15. An improved bearing cage for use in an unitized contact thrust bearing assembly of the type having an outer bearing race having on its radially inward surface a curvilinear raceway, an inner race coaxial with the first race having on its radially outward surface a curvilinear raceway in confronting relation to the curvilinear raceway of the outer race, a complement of bearing balls between the inner and outer curvilinear raceways, and a bearing cage, having upper and lower coaxial cylindrical shoulders, the diameter of the radially inner surface of the upper cylindrical shoulder being greater than the diameter of the radially outer surface of the lower cylindrical shoulder, said bearing cage having a connecting shoulder integral with the upper and lower cylindrical shoulders and having circumferentially disposed in said connecting shoulder and extending axially into said upper and lower cylindrical shoulders a plurality of ball bearing retaining cavities, wherein the improvement comprises:

a bearing cage having at least two upper restraining tabs disposed on the upper cylindrical shoulder each upper restraining tab being radially inwardly directed and positioned axially directly above one of the bearing retaining cavities and each upper restraining tab having a circumferential dimension less than or equal to the circumferential dimension of the bearing retaining cavity above which it is positioned, said bearing cage having at least two lower restraining tabs, each disposed on a separate connecting means which extends axially downward from the lower cylindrical shoulder and is integral with the lower cylindrical shoulder and the lower restraining tab, each lower restraining tab being radially outwardly directed and positioned axially directly below one of the bearing retaining cavities not having an upper restraining tab positioned axially thereover, and each lower restraining tab having a circumferential dimension less than or equal to the circumferential dimension of the bearing retaining cavity below which it is positioned, the upper restraining tabs serving to restrain in the assembled bearing the inner race from an axial displacement away from its functional position confronting the outer race, the lower restraining tabs serving to restrain in the assembled bearing the outer race from an axial displacement away from its functional position confronting the inner race, said upper restraining tabs being sufficiently resilient to allow insertion of the inner race past said tabs to its functional assembled position, said lower restraining tabs being sufficiently resilient to allow movement of the outer race past said tabs to its functional assembled position, said upper restraining tabs extending radially inwardly from the upper cylindrical shoulder to a radial distance from the axis of the upper and lower cylindrical shoulders not less than the radius of the outside surface of the lower cylindrical shoulder, and said lower restraining tabs extending radially outwardly from the lower cylindrical shoulder to a radial distance from the axis of the upper and lower cylindrical shoulders less than the radius of the inner surface of the upper cylindrical shoulder.

16. The improved bearing retaining cage according to claim 15, wherein said upper tabs comprise two tabs positioned circumferentially substantially 180° opposite each other.

17. The improved bearing retaining cage according to claim 15, wherein, said lower tabs comprise two tabs comprise two tabs positioned substantially 180° opposite each other.

18. An improved bearing cage for use in an unitized contact thrust bearing assembly of the type having an outer bearing race having on its radially inward surface a curvilinear raceway, an inner race coaxial with the first race having on its radially outward surface a curvilinear raceway in confronting relation to the curvilinear raceway of the outer race, a complement of bearing balls between the inner and outer curvilinear raceways, and a bearing cage, having upper and lower coaxial cylindrical shoulders, the diameter of the radially inner surface of the upper cylindrical shoulder being greater than the diameter of the radially outer surface of the lower cylindrical shoulder, said bearing cage having a connecting shoulder integral with the upper and lower cylindrical shoulders and having circumferentially disposed in said connecting shoulder and extending axially into said upper and lower cylindrical shoulders a plurality of ball bearing retaining cavities, wherein the improvement comprises:

a bearing cage having at least two upper restraining tabs, each disposed on a separate connecting means which extends axially upwards from the upper cylindrical shoulder and is integral with the upper cylindrical shoulder, each upper restraining tab being radially inwardly directed and positioned axially directly above one of the bearing retaining cavities and each upper restraining tab having a circumferential dimension less than or equal to the circumferential dimension of the bearing retaining cavity above which it is positioned, said bearing cage having at least two lower restraining tabs disposed on the lower cylindrical shoulder, each lower restraining tab being radially outwardly directed and postioned axially directly below one of the bearing retaining cavities not having an upper restraining tab positioned axially thereover, and each lower restraining tab having a circumferential dimension less than or equal to the circumferential dimension of the bearing retaining cavity below which it is positioned, the upper restraining tabs serving to restrain in the assembled bearing the inner race from an axial displacement away from its functional position confronting the outer race, the lower restraining tabs serving to restrain in the assembled bearing the outer race from an axial displacement away from its functional position confronting the inner race, said upper restraining tabs being sufficiently resilient to allow insertion of the inner race past said tabs to its functional assembled position, said lower restraining tabs being sufficiently resilient to allow movement of the outer race past said tabs to its functional assembled position, said upper restraining tabs extending radially inwardly from the upper cylindrical shoulder to a radial distance from the axis of the upper and lower cylindrical shoulders not less than the radius of the outside surface of the lower cylindrical shoulder, and said lower restraining tabs extending radially outwardly from the lower cylindrical shoulder to a radial distance from the axis of the upper and lower cylindrical shoulders less than the radius of the inner surface of the upper cylindrical shoulder.

19. The improved bearing retaining cage according to claim 18, wherein said upper tabs comprise two tabs positioned circumferentially substantially 180° opposite each other.

20. The improved bearing retaining cage according to claim 18, wherein, said lower tabs comprise two tabs comprise two tabs positioned substantially 180° opposite each other.

21. An improved bearing cage for use in a unitized contact thrust bearing assembly of the type having an outer bearing race having on its radially inward surface a curvilinear raceway, an inner race coaxial with the first race having on its radially outward surface a curvilinear raceway in confronting relation to the curvilinear raceway of the outer race, a complement of bearing balls between the inner and outer curvilinear raceways, and a bearing cage, having upper and lower coaxial cylindrical shoulders, the diameter of the radially inner surface of the upper cylindrical shoulder being greater than the diameter of the radially outer surface of the lower cylindrical shoulder, said bearing cage having a connecting shoulder, said bearing cage having a connecting shoulder integral with the upper and lower cylindrical shoulders and having circumferentially disposed in said connecting shoulder a plurality of ball bearing retaining cavities, wherein the improvement comprises:

a bearing cage having at least two upper restraining tabs disposed on the upper cylindrical shoulder each upper restraining tab being radially inwardly directed and positioned axially directly above one of the bearing retaining cavities and each upper restraining tab having a circumferential dimension less than or equal to the circumferential dimension of the bearing retaining cavity above which it is positioned, said bearing case having at least two lower restraining tabs, each disposed on a separate connecting means which extends axially downward from the lower cylindrical shoulder and is integral with the lower cylindrical shoulder and the lower restraining tab, each lower restraining tab being radially outwardly directed and positioned axially directly below one of the bearing retaining cavities not having an upper restraining tab positioned axially thereover and each lower restraining tab having a circumferential dimension less than or equal to the circumferential dimension of the bearing retaining cavity below which it is positioned, the upper restraining tabs serving to restrain in the assembled bearing the inner race from an axial displacement away from its functional position confronting the outer race, the lower restraining tabs serving to restrain in the assembled bearing the outer race from an axial displacement away from its functional position confronting the inner race, said upper restraining tabs being sufficiently resilient to allow insertion of the inner race past said tabs to its functional assembled position, said lower restraining tabs being sufficiently resilient to allow movement of the outer race past said tabs to its functional assembled position, said upper restraining tabs extending radially inwardly from the upper cylindrical shoulder to a radial distance from the axis of the upper and lower cylindrical shoulders not less than the radius of the outside surface of the lower cylindrical shoulder, said lower restraining tabs extending radially outwardly from the lower cylindrical shoulder to a radial distance from the axis of the upper and lower clindrical shoulders less than the radius of the inner surface of the upper cylindrical shoulder; and said ball bearing retaining cavities not extending axially into said upper and lower cylindrical shoulders.

22. The improved bearing retaining cage according to claim 21, wherein said upper tabs comprise two tabs positioned circumferentially substantially 180° opposite each other.

23. The improved bearing retaining cage according to claim 21, wherein, said lower tabs comprise two tabs positioned circumferentially substantially 180° opposite each other.

24. An improved bearing cage for use in a unitized contact thrust bearing assembly of the type having an outer bearing race having on its radially inward surface a curvilinear raceway, an inner race coaxial with the first race having n its radially outward surface a curvilinear raceway in confronting relation to the curvilinear raceway of the outer race, a complement of bearing balls between the inner and outer curvilinear raceways, and a bearing cage, having upper and lower coaxial cylindrical shoulders, the diameter of the radially inner surface of the upper cylindrical shoulder being greater than the diameter of the radially outer surface of the lower cylindrical shoulder, said bearing cage having a connecting shoulder, said bearing cage having a connecting shoulder integral with the upper and lower cylindrical shoulders and having circumferentially disposed in said connecting shoulder a plurality of ball bearing retaining caviites, wherein the improvement comprises:

a bearing cage having at least two upper restraining tabs, each disposed on a separate connecting means which extends axially upwards from the upper cylindrical shoulder and is integral with the upper cylindrical shoulder each upper restraining tab being radially inwardly directed and positioned axially directly above one of the bearing retaining cavities and each upper restraining tab having a circumferential dimension less than or equal to the circumferential dimension of the bearing retaining cavity above which it is positioned, said bearing cage having at least two lower restraining tabs disposed on the lower cylindrical shoulder, each lower restraining tab being radially outwardly directed and positioned axially directly below one of the bearing retaining cavities not having an upper restraining tab positioned axially thereover and each lower restraining tab having a circumferential dimension less than or equal to the circumferential dimension of the bearing retaining cavity below which it is positioned, the upper restraining tabs serving to restrain in the assembled bearing the inner race from an axial displacement away from its functional position confronting the outer race, the lower restraining tabs serving to restrain in the assembled bearing the outer race from an axial displacement away from its functional position confronting the inner race, said upper restraining tabs being sufficiently resilient to allow insertion of the inner race past said tabs to its functional assembled position, said lower restraining tabs being sufficiently resilient to allow movement of the outer race past said tabs to its functional assembled position, said upper restraining tabs extending radially inwardly from the upper cylindrical shoulder to a radial distance from the axis of the upper and lower cylindrical shoulders not less than the radius of the outside surface of the lower cylindrical shoulder, said lower restraining tabs extending radially outwardly from the lower cylindrical shoulder to a radial distance from the axis of the upper and lower cylindrical shoulders less than the radius of the inner surface of the upper cylindrical shoulder; and said ball bearing retaining cavities not extending axially into said upper and lower cylindrical shoulders.

25. The improved bearing retaining cage according to claim 24, wherein said upper tabs comprise two tabs positioned circumferentially substantially 180° opposite each other.

26. The improved bearing retaining cage according to claim 24, wherein, said lower tabs comprise two tabs positioned circumferentially substantially 180° opposite each other.

* * * * *